(12) United States Patent
Kato (10) Patent No.: US 11,386,727 B2
(45) Date of Patent: Jul. 12, 2022

(54) TRANSMISSION CONTROL DEVICE (71) Applicant: DENSO CORPORATION, Kariya (JP)

(72) Inventor: Kenji Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 126 days.

(21) Appl. No.: 16/860,929

(22) Filed: Apr. 28, 2020

(65) Prior Publication Data

US 2020/0258332 A1 Aug. 13, 2020

Related U.S. Application Data (63) Continuation of application No. PCT/JP2018/035239, filed on Sep. 24, 2018.

(30) Foreign Application Priority Data

Oct. 31, 2017 (JP) .............................. JP2017-210208

(51) Int. Cl.
*G07C 9/00* (2020.01)
*B60R 25/24* (2013.01)

(52) U.S. Cl.
CPC ........ *G07C 9/00309* (2013.01); *B60R 25/245* (2013.01); *G07C 2009/00555* (2013.01); *G07C 2009/00769* (2013.01)

(58) Field of Classification Search
None
See application file for complete search history.

(56) References Cited

U.S. PATENT DOCUMENTS

| 7,813,755 | B2 * | 10/2010 | Ochi | H01Q 23/00 |
| | | | | 455/522 |
| 2003/0040291 | A1 * | 2/2003 | Brewer | H03G 1/0088 |
| | | | | 455/127.1 |
| 2008/0085733 | A1 | 4/2008 | Ochi et al. | |
| 2012/0086567 | A1 | 4/2012 | Namizaki et al. | |
| 2013/0088382 | A1 | 4/2013 | Lee et al. | |

FOREIGN PATENT DOCUMENTS

| JP | 2008098816 A | 4/2008 |
| JP | 2009030337 A | 2/2009 |
| JP | 2010185186 A | 8/2010 |
| JP | 2012085096 A | 4/2012 |
| JP | 2014532167 A | 12/2014 |

* cited by examiner

*Primary Examiner* — Carlos Garcia
(74) *Attorney, Agent, or Firm* — Harness, Dickey & Pierce, P.L.C.

(57) ABSTRACT

A transmission control device is used in an authentication system. The authentication system enables control of an authentication target based on authentication established by verification via wireless communication between the authentication target and a portable device carried by a user. The transmission control device outputs a drive current to a transmission antenna to cause the transmission antenna to transmit a signal having a predetermined frequency band. The transmission control device adjusts the output drive current. The transmission control device detects a current flowing through the transmission antenna.

7 Claims, 7 Drawing Sheets

TRANSMISSION CONTROL DEVICE

CROSS REFERENCE TO RELATED APPLICATIONS

The present application is a continuation application of International Patent Application No. PCT/JP2018/035239 filed on Sep. 24, 2018, which designated the U.S. and claims the benefit of priority from Japanese Patent Application No. 2017-210208 filed on Oct. 31, 2017. The entire disclosures of all of the above applications are incorporated herein by reference.

TECHNICAL FIELD

The present disclosure relates to a transmission control device.

BACKGROUND

An authentication system that enables control of an authentication target based on authentication established by verification between the authentication target and a portable device via wireless communication has been proposed.

SUMMARY

The present disclosure provides a transmission control device. The transmission control device is used in an authentication system. The authentication system enables control of an authentication target based on authentication established by verification via wireless communication between the authentication target and a portable device carried by a user. The transmission control device outputs a drive current to a transmission antenna to cause the transmission antenna to transmit a signal having a predetermined frequency band. The transmission control device adjusts the output drive current. The transmission control device detects a current flowing through the transmission antenna.

BRIEF DESCRIPTION OF DRAWINGS

The features and advantages of the present disclosure will become more apparent from the following detailed description made with reference to the accompanying drawings. In the drawings.

DETAILED DESCRIPTION

For example, an authentication system that performs verification between a vehicle device and a portable device via wireless communication to lock and unlock a door of a vehicle has been proposed. In the authentication system, in order to reduce unauthorized unlocking by a relay attack, change of intensity of a request signal transmitted from a transmission antenna of the vehicle is controlled and the portable device detects the presence or absence of the change in the intensity of the request signal.

In order to realize the above-described authentication system, it is desired to accurately transmit the request signal having intended intensity.

The present disclosure provides a transmission control device that enables an accurate output of a request signal having intended intensity in an authentication system that enables control of an authentication target based on authentication established by verification via wireless communication between the authentication target and a portable device.

An example embodiment of the present disclosure provides a transmission control device. The transmission control device is used in an authentication system. The authentication system enables control of an authentication target based on authentication established by verification via wireless communication between the authentication target and a portable device carried by a user. The transmission control device includes an antenna drive unit, a current adjustment unit, a monitor unit, and a correction value determination unit. The antenna drive unit is configured to output a drive current to a transmission antenna to cause the transmission antenna to transmit a signal having a predetermined frequency band. The current adjustment unit is configured to adjust the drive current output by the antenna drive unit. The monitor unit is configured to detect a current flowing through the transmission antenna. The correction value determination unit is configured to determine a correction value of the drive current by feedback control based on the current detected by the monitor unit. After the correction value determination unit determines the correction value, the current adjustment unit corrects the drive current for transmitting, as the signal, a request signal used for the verification based on the correction value.

In the example embodiment of the present disclosure, the transmission control device determines the correction value of the drive current output by the antenna drive unit by the feedback control based on the current detected by the monitor unit. Thus, the transmission control device can determine the correction value for accurately adjusting the current flowing through the transmission antenna to the target value. After the correction value is determined, the drive current for transmitting the request signal as the signal used for the verification is corrected based on the correction value. Thus, the transmission control device can accurately adjust the current flowing through the transmission antenna to the target value, and output the request signal having the accurately intended intensity. As a result, in the authentication system that enables the control of the authentication target based on the establishment of the authentication by the verification via the wireless communication between the authentication target and the portable device, the request signal having the accurately intended intensity can be output.

Multiple embodiments will be described for disclosure hereinafter with reference to the drawings. For convenience of description, the same reference numerals are assigned to portions having the same functions as those shown in the drawings used in the description so far among the plurality of embodiments, and a description of the same portions may be omitted. Description in another applicable embodiment may be referred to for such a portion denoted by the identical reference sign.

First Embodiment (Authentication System 1)

Figure 1:
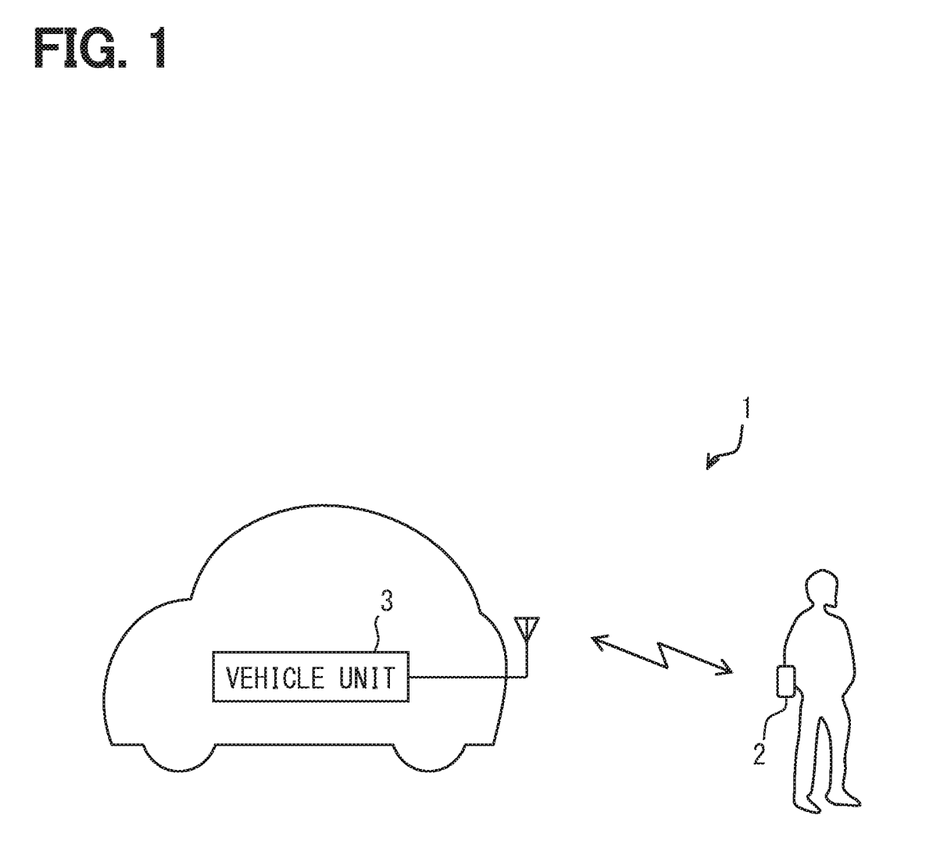
FIG. 1 is a diagram showing an example of a schematic configuration of an authentication system.

The first embodiment of the present disclosure is described with reference to the drawings. FIG. 1 is a diagram showing a schematic configuration of an authentication system 1. The authentication system 1 shown in FIG. 1 includes a portable device 2 carried by a user and a vehicle unit 3 mounted on a vehicle.

The authentication system 1 has a so-called smart function. The smart function is a function of performing authentication by verification between the portable device 2 and the vehicle unit 3 via wireless communication, and enabling control of the vehicle as an authentication target when the authentication is established. The control of the vehicle, which is enabled by the authentication, may include locking and unlocking of a door, starting of a travel drive source.

The mobile device 2 has a function of an electronic key. The mobile device 2 may be provided by a Fob, a multi-functional mobile phone having the function of the electronic key, or the like. The portable device 2 receives a request signal transmitted from the vehicle unit 3 on a radio wave of an LF (Low Frequency) band via a reception antenna. The LF band is a low frequency band, for example, from 30 kHz to 300 kHz. In the present embodiment, the request signal is a signal for requesting transmission of a code for the verification, and is a signal used for the verification. When challenge response system is employed, the request signal corresponds to a challenge signal, and the signal for requesting transmission corresponds to an encrypted code in which the code of the challenge signal is encrypted by a secret key and an encryption algorithm used in common key encryption system.

Further, when the portable device 2 receives the request signal, the portable device 2 transmits a response signal including a code for the verification on a radio wave in an RF (Radio Frequency) band from the transmission antenna. The RF band is a high frequency band, for example, from 300 Hz to 3 THz. When the request signal includes a code for the verification on the portable device 2, a condition for replying the response signal is for the portable device 2 to establish the code verification by the code. Further in the portable device 2, in order to reduce a relay attack, the condition for replying the response signal may include satisfaction of a change in an output of the request signal controlled according to a predetermined logic on the vehicle unit 3.

(Vehicle Unit 3)

Figure 2:
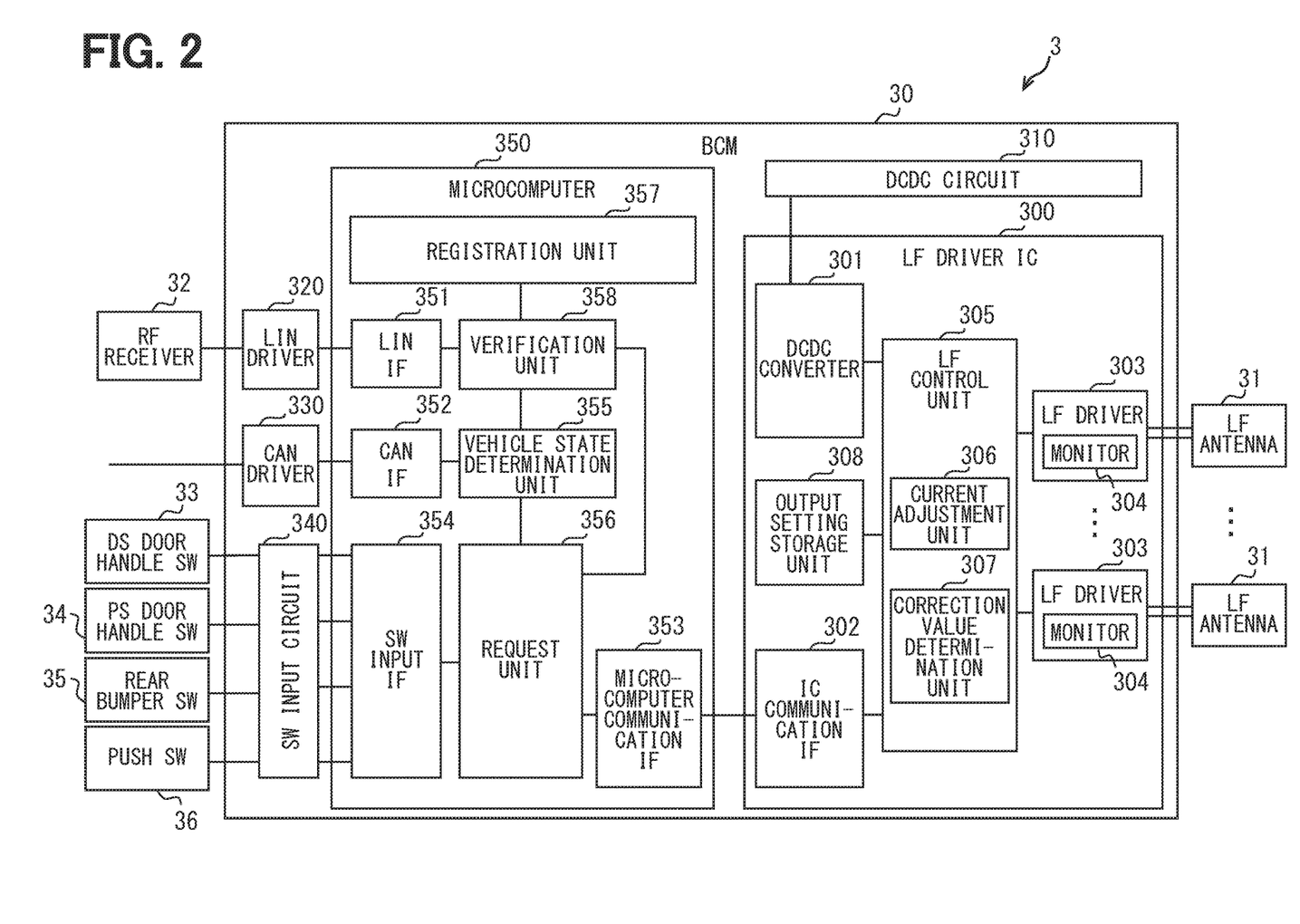
FIG. 2 is a diagram showing an example of a schematic configuration of a vehicle unit and a BCM.

With reference to FIG. 2, an example of a schematic configuration of the vehicle unit 3 will be described. As shown in FIG. 2, the vehicle unit 3 includes a BCM (Body Control Module) 30, an LF antenna 31, an RF receiver 32, a DS door handle switch 33, a PS door handle switch 34, a rear bumper switch 35, and a push switch 36. Hereinafter, the switch is referred to as the SW.

The LF antenna 31 is a transmission antenna that transmits a signal on the radio wave of the LF band. Multiple LF antennas 31 may be provided in the vehicle. For example, the LF antennas 31 may be provided near a door of a driver's seat (DS), near a seat of a passenger seat (PS), near a door of a trunk room, in a vehicle compartment, and the like. The RF receiver 32 receives the response signal transmitted from the portable device 2 on the radio wave of the RF band.

The DS door handle SW 33 is a switch provided on an outer door handle of the driver's seat of the vehicle. The PS door handle SW 34 is a switch provided on an outer door handle of the passenger seat of the vehicle. The rear bumper SW 35 is a switch provided on the rear bumper of the vehicle. The push SW 36 is a switch provided in a front area of the driver's seat for requesting the start of a travel drive source of the vehicle.

The BCM 30 includes a processor, a memory, an I/O, and a bus that connects those devices, and executes various processes related to the authentication in the vehicle by executing a control program stored in the memory. The memory referred to herein is a non-transitory tangible storage medium configured to non-temporarily store a program and data readable by a computer. The non-transitory tangible storage medium is embodied by a semiconductor memory or a magnetic disk.

(BCM 30)

With reference to FIG. 2, an example of a schematic configuration of the BCM 30 will be described. As shown in FIG. 2, the BCM 30 includes an LF driver IC 300, a DCDC circuit 310, a LIN driver 320, a CAN driver 330, a SW input circuit 340, and a microcomputer 350. CAN is a registered trademark.

The BCM 30 is connected to a CAN bus, which is a transmission path for performing communication using CAN as a communication protocol, and a LIN bus, which is a transmission path for performing communication using LIN as a communication protocol. Hereinafter, the transmission path through which the BCM 30 exchanges information with an actuator such as a door lock motor, a vehicle light, the RF receiver 32, or the like is the LIN bus. The transmission path through which the BCM 30 exchanges information with another electronic control device such as a power unit ECU that controls the travel drive source of the vehicle is the CAN bus.

The DCDC circuit 310 is a circuit that inputs a DC voltage to the LF driver IC 300. The LIN driver 320 outputs information to the LIN bus and acquires the information output to the LIN bus. The LIN driver 320 acquires a code of the response signal acquired by the RF receiver 32 from the RF receiver 32. The LIN driver 320 outputs the acquired information to the microcomputer 350. In addition, the LIN driver 320 outputs, to the door lock motor, a drive signal output from the microcomputer 350 for controlling locking and unlocking of the vehicle door.

The CAN driver 330 outputs information to the CAN bus and acquires information output to the CAN bus. The CAN driver 330 outputs a start permission signal output from the microcomputer 350 to the power unit ECU. The CAN driver 330 acquires a sensing result related to a vehicle state such as a vehicle speed output from another ECU and outputs the sensing result to the microcomputer 350.

The SW input circuit 340 is a circuit to which the signals transmitted from the DS door handle SW33, the PS door handle SW34, the rear bumper SW35, and the push SW36 are input, and transmits the input signals to the microcomputer 350.

As shown in FIG. 2, the microcomputer 350 includes, as functional blocks, a LIN interface 351, a CAN interface 352, a microcomputer communication interface 353, a SW input interface 354, a vehicle state determination unit 355, a request unit 356, a registration unit 357, and a verification unit 358. Hereinafter, the interface is referred to as an IF.

The LINIF 351 is an IF for communication between the LIN driver 320 and the microcomputer 350. The CANIF 352 is an IF for communication between the CAN driver 330 and the microcomputer 350. The microcomputer communication IF 353 is an IF for serial communication between the microcomputer 350 and the LF driver IC 300. The SW input IF 354 is an IF for communication between the SW input circuit 340 and the microcomputer 350.

The vehicle state determination unit 355 determines the state of the vehicle based on the sensing result related to the vehicle state acquired from the CAN driver 330 via the CANIF 352. For example, the vehicle state determination unit 355 determines whether the vehicle is parked or the vehicle is traveling based on a vehicle speed detected by a vehicle speed sensor, a shift position detected by a shift position sensor, a signal of a parking brake switch, or the like.

The request unit 356 requests the LF driver IC 300 to transmit the request signal or to correct the current of the LF antenna 31 via the microcomputer communication IF 353 based on the signal obtained through the SW input circuit 340 and the vehicle state determined by the vehicle state determination unit 355. The processes performed by the request unit 356 will be described later in more detail.

The registration unit 357 may be provided by an electrically rewritable nonvolatile memory, and store information for the authentication. The information for the authentication may be provide by a code of a genuine portable device 2 or the secret key used in the common key encryption system when the challenge response system is employed.

The verification unit 358 compares the code of the response signal acquired by the RF receiver 32 via the LINIF 351 and the genuine code using the information for the authentication stored in the registration unit 357. When the information for authentication is the code of the genuine portable device 2, the verification unit 358 compares the code of the response signal and the code of the genuine portable device 2. When the challenge response method is employed, the verification unit 358 compares the encrypted code of the response signal acquired by the RF receiver 32 and the encrypted code acquired by encrypting the code of the challenge signal transmitted from the LF antenna 31 using the secret key stored in the registration unit 357.

When the verification unit 358 performs the verification with the portable device 2 outside the vehicle compartment (hereinafter, exterior verification) and the authentication is established, the drive signal for controlling the locking and unlocking of the vehicle door is transmitted to the door lock motor via the LINIF 351 and the LIN driver 320, and the locking and unlocking of the vehicle door is performed. When performing the exterior verification and the authentication is established, the verification unit 358 transmits the drive signal for turning on the light as a welcome function drive to a lighting such as the small lamp, the interior lamp, or the like via the LINIF 351 and the LIN driver 320, and causes the lighting to be automatically turned on.

When the verification unit 358 performs the verification with the portable device 2 inside the vehicle compartment (hereinafter, inside verification) and the authentication is established, the verification unit 358 transmits the start permission signal to the power unit ECU via the CANIF 352 and the CAN driver 330 and causes the travel drive source of the vehicle to be activated. For example, when the RF receiver 32 receives a reply to a signal transmitted from the LF antenna 31 whose communication range is limited to the inside of the vehicle compartment, the verification unit 358 determines that the inside verification is established. For example, when the reply to a signal transmitted from the LF antenna 31 whose communication range is limited to the inside of the vehicle compartment is not received but a reply to a signal transmitted from the LF antenna 31 whose communication range extends to the outside of the vehicle compartment is received, the verification unit 358 determines that the outside verification is established.

The LF driver IC 300 is an IC that transmits a signal from the LF antenna 31. The LF driver IC 300 and the BCM 30 including the LF driver IC 300 correspond to a transmission control device. The LF driver IC 300 transmits the request signal from the LF antenna 31 according to a request from the microcomputer 350. Further, the LF driver IC 300 determines the correction value of the drive current for transmitting a signal to be output to the LF antenna 31 according to the current correction request from the microcomputer 350, and corrects the drive current. Detailed configuration of the LF driver IC 300 will be described below.

(LF Driver IC 300)

With reference to FIG. 2, an example of a schematic configuration of the LF driver IC 300 will be described. As shown in FIG. 2, the LF driver IC 300 includes, as functional blocks, a DCDC converter 301, an IC communication IF 302, an LF driver 303, an LF control unit 305, and an output setting storage unit 308.

The DCDC converter 301 converts a DC voltage input from the DCDC circuit 310 into a power supply voltage required for the operation of the LF driver IC 300. The IC communication IF 302 is an IF for serial communication between the LF driver IC 300 and the microcomputer 350.

The LF driver 303 outputs the drive current for transmitting a signal to the LF antenna 31 based on the control of the LF control unit 305. The LF driver 303 corresponds to an antenna drive unit. The LF driver 303 corresponds to an antenna driver. The LF driver 303 has a monitor unit 304 and detects a current flowing through the LF antenna 31. The monitor unit 304 may detect the current flowing through the LF antenna 31 by a current detection circuit. Alternatively, the monitor unit 304 may detect the current flowing through the LF antenna 31 by measuring a voltage of the LF antenna 31 and converting the measured voltage. The monitor unit 304 corresponds to a monitor.

The LF control unit 305 controls the LF driver 303 to output the drive current for transmitting a signal to the LF antenna 31 so that the LF antenna 31 transmits a signal. When receiving transmission request of the request signal from the microcomputer 350 via the IC communication IF 302, the LF control unit 305 causes the LF antenna 31 to output the drive current for transmitting the request signal to the LF antenna 31. With this configuration, the request signal is transmitted from the LF antenna 31. The LF control unit 305 may change the intensity of the request signal according to a predetermined logic.

The LF control unit 305 includes a current adjustment unit 306 and a correction value determination unit 307. The current adjustment unit 306 adjusts the drive current output from the LF driver 303. When receiving a request for correcting the current from the microcomputer 350 via the IC communication IF 302, the correction value determination unit 307 determines the correction value of the drive current output from the LF driver 303 by feedback control based on the current detected by the monitor unit 304. The correction value determination unit 307 stores the determined correction value in the output setting storage unit 308. The output setting storage unit 308 may be provided by an electrically rewritable memory. After the correction value determination unit 307 determines the correction value, the current adjustment unit 306 corrects the drive current for transmitting the request signal in order that the intensity of the request signal is to be a target value based on the correction value stored in the output setting storage unit 308.

Figure 3:
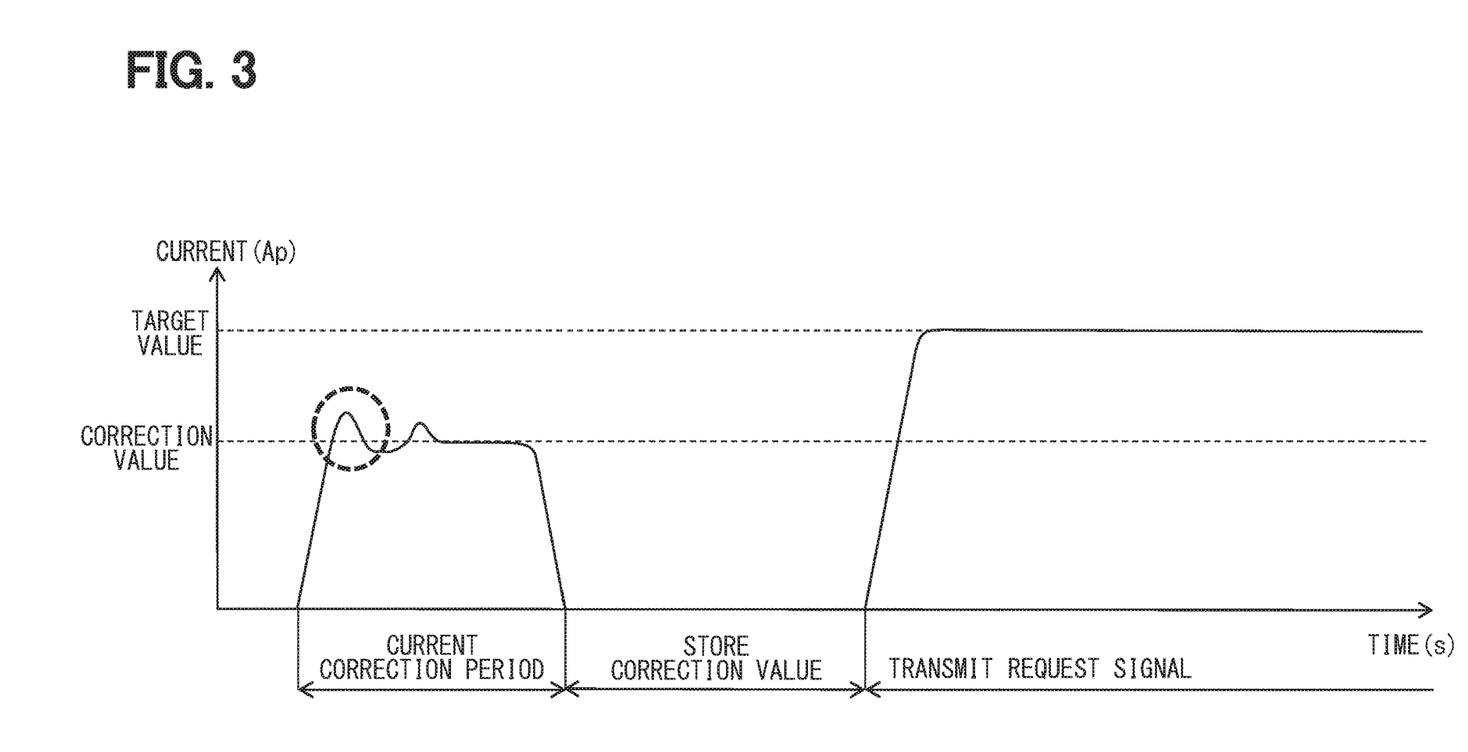
FIG. 3 is a diagram showing an example of determination of a correction value of a drive current by a correction value determination unit.

Here, the determination of the correction value of the drive current by the correction value determination unit 307 will be described in more detail with reference to FIG. 3. FIG. 3 is a diagram showing a change over time of a current flowing through the LF antenna 31. In FIG. 3, the vertical axis represents the current and the horizontal axis represents time.

The correction value determination unit 307 determines, by feedback control, the correction value of the drive current in order that the current flowing through the LF antenna 31 is to be the target value. For example, the correction value determination unit 307 calculates difference between the drive current output from the LF driver 303 and the correction target based on shifts in phase and amplitude. While adjusting the drive current so as to eliminate the difference, the correction value determination unit 307 performs the feedback control until the current flowing through the LF antenna 31 is to be the correction target value. Then, the correction value determination unit 307 determines, as the correction value, the value of the drive current when the current flowing through the LF antenna 31 is to be the correction target value. This process corresponds to a current correction period in FIG. 3. Further, the correction value determination unit 307 stores the determined correction value in the output setting storage unit 308.

When transmitting the request signal from the LF antenna 31, the current adjustment unit 306 corrects the drive current for transmitting the request signal so that the current flowing through the LF antenna 31 is to be the target value based on the correction value stored in the output setting storage unit 308. Subsequently, the current adjustment unit 306 transmits the request signal from the LF antenna 31. As shown in FIG. 3, the correction value may be different from the target value of the current when the request signal is transmitted. In this case, the request signal is corrected to be the value of the drive current according to the target value of the current when the request signal is transmitted. The correction is performed based on a ratio of the correction value stored in the output setting storage unit 308 and the value of the correction target of the current flowing through the LF antenna 31 in the correction value. For example, the correction value may be determined with 500 mA as the correction target, and 1 A may be the target value. In this case, the drive current is corrected according to 1 A based on the ratio of the correction value in 500 mA and 500 mA. When the correction value is the same as the target value of the current when the request signal is transmitted, the correction value stored in the output setting storage unit 308 may be used without the correction.

When the correction value determination unit 307 determines the correction value by the feedback control when transmitting the request signal, responsiveness deteriorates until the current flowing through the LF antenna 31 reaches the target value. In addition, when the intensity of the request signal is large, noise due to overshoot increases as shown by a broken-line circle in FIG. 3. Therefore, as shown in FIG. 3, the correction value determination unit 307 determines the correction value in a signal (hereinafter, a test signal) to be transmitted to the LF antenna 31 as a trial before the transmission of the request signal by the feedback control based on the current detected by the monitor unit 304 with respect to the drive current output by the LF driver 303.

In addition, in a signal including data such as a request signal, the current value greatly changes in order to represent two values of "1" and "0". Therefore, it is difficult to determine the correction value by the feedback control. Therefore, the correction value is determined by the feedback control using the test signal in which the current value does not include the data and is continuous. The determination of the correction value by the correction value determination unit 307 may be performed in accordance with a request of the current correction from the microcomputer 350. Hereinafter, some specific examples of time points at which the correction value determination unit 307 determines the correction value will be described.

(Correction Value Determination Processing in BCM 30)

Here, examples of flows of processing related to the determination of the correction value of the drive current for transmitting the request signal in the BCM 30 (hereinafter, correction value determination processing) will be described with reference to the flowcharts of FIGS. 4 to 6.

For example, a time point at which the correction value determination unit 307 determines the correction value may be a time point at which the BCM 30 is connected to the battery of the vehicle and is activated for the first time. The flowchart in FIG. 4 is a diagram showing an example of a flow of the correction value determination processing when the correction value is determined at the time point when the BCM 30 is connected to the battery of the vehicle and is activated for the first time. The flowchart of FIG. 4 starts when the BCM 30 is connected to the battery of the vehicle.

First, in S1, the microcomputer 350 starts initialization of the microcomputer power. In S2, the request unit 356 of the microcomputer 350 requests the LF driver IC 300 to correct the current. In S3, the LF control unit 305 of the LF driver IC 300 causes the LF driver 303 to transmit the test signal, and determines the correction value by the feedback control based on the current detected by the monitor unit 304 with respect to the drive current output by the LF driver 303. Then, the determined correction value is stored in the output setting storage unit 308, and the correction value determination processing is terminated. At the time of transmitting the request signal thereafter, the drive current for transmitting the request signal may be corrected using the correction value.

Accordingly, even when the BCM 30 is connected to the battery of the vehicle and is activated for the first time, before the transmission of the request signal from the LF antenna 31, the correction value of the drive current can be determined by the above-described feedback control, and the correction value for accurately adjusting the current flowing through the antenna 31 to the target value can be stored in the output setting storage unit 308. Therefore, even when the LF antenna 31 and the BCM 30 vary from device to device when mounted on the vehicle, the drive current for transmitting the request signal can be corrected using the correction value and the request signal having accurately intended intensity can be transmitted.

Another example of the time point at which the correction value determination unit 307 determines the correction value may be a time point at which the vehicle is parked and the vehicle interior verification has been finished. The flowchart in FIG. 5 is a diagram showing an example of the flow of the correction value determination processing when the correction value is determined in a case where the vehicle is parked and the vehicle interior verification has been finished. The flowchart in FIG. 5 may start when, for example, the vehicle state determination unit 355 determines that the vehicle is parked and a signal indicating that the push SW 36 has been operated is input to the BCM 30.

First, in S21, the request unit 356 of the microcomputer 350 requests the LF driver IC 300 to transmit the request signal, and the LF driver IC 300 causes the LF antenna 31 to transmit the request signal.

In S22, when the vehicle interior verification is established by the verification unit 358, the processing proceeds to S23. On the other hand, when the vehicle interior verification is not established by the verification unit 358, the processing returns to S21 and repeats the process. In S23, the verification unit 358 outputs the start permission signal to the power unit ECU, and starts the travel drive source of the vehicle.

In S24, the request unit 356 of the microcomputer 350 requests the LF driver IC 300 to correct the current. In S25, the LF control unit 305 of the LF driver IC 300 causes the LF driver 303 to transmit the test signal, and determines the correction value by the feedback control based on the current detected by the monitor unit 304 with respect to the drive current output by the LF driver 303. Then, the determined correction value is stored in the output setting storage unit 308, and the correction value determination processing is terminated. At the time of transmitting the request signal thereafter, the drive current for transmitting the request signal may be corrected using the correction value.

Each time the vehicle interior verification is finished when the vehicle is parked, the correction value is determined by the above-described feedback control. Accordingly, even under the influence of temperature, aging, or the like, the request signal having the accurately intended intensity can be output.

Another example of the time point at which the correction value determination unit 307 determines the correction value may be a time point at which the vehicle is traveling. The flowchart in FIG. 6 is a diagram showing an example of the flow of the correction value determination processing when the correction value is determined in a case where the vehicle is traveling. The flowchart in FIG. 6 may start when, for example, the vehicle state determination unit 355 determines that the vehicle is traveling. In FIG. 6, an example in which the vehicle interior verification is periodically performed when the vehicle is traveling for preventing the vehicle from being taken out due to relay attack by a third party will be described. In the relay attack, the third party indirectly realizes the wireless communication between the BCM 30 and the portable device 2 by transmitting the request signal from the LF antenna 31 to a far distance using a relay device in order to establish the authentication illegally.

In S41, when an AM (Amplitude Modulation) radio broadcasted on the medium wave using amplitude modulation is used, the processing proceeds to S46. On the other hand, when the AM radio is not used, the processing proceeds to S42. Whether the AM radio is used or not may be determined by the vehicle state determination unit 355, via the CAN driver 330 and the CANIF 352, receiving a signal related to an operation of a receiver of the AM radio mounted on the vehicle.

In S42, the request unit 356 of the microcomputer 350 periodically requests the LF driver IC 300 to transmit the request signal, and the LF driver IC 300 periodically causes the LF antenna 31 to transmit the request signal. The term "periodically" as used herein refers to a time interval that can be set arbitrarily, and may be, for example, several minutes.

In S43, when the vehicle interior verification is established by the verification unit 358, the processing proceeds to S44. On the other hand, when the vehicle interior verification is not established by the verification unit 358, the processing returns to S41 and repeats the process. When the vehicle interior verification is not established in S43, the vehicle may be stopped or the like to prevent the vehicle from being taken out due to the relay attack.

In S44, the request unit 356 of the microcomputer 350 requests the LF driver IC 300 to correct the current. In S45, the LF control unit 305 of the LF driver IC 300 causes the LF driver 303 to transmit the test signal, and determines the correction value by the feedback control based on the current detected by the monitor unit 304 with respect to the drive current output by the LF driver 303. The correction value determination unit 307 stores the determined correction value in the output setting storage unit 308. At the time of transmitting the request signal thereafter, the drive current for transmitting the request signal may be corrected using the correction value.

In S46, when the end time point of the correction value determination processing arrives, the correction value determination processing is terminated. On the other hand, when it is not the end time point of the correction value determination processing, the processing returns to S41 to repeat the process. The end time point of the correction value determination processing referred to here includes, for example, when the ignition power of the vehicle is turned off.

When the vehicle is travelling, the correction value is periodically determined by the above-described feedback control. Accordingly, even under the influence of temperature, aging, or the like, the request signal having the accurately intended intensity can be output.

When the AM radio is used, the request signal may not be transmitted or the test signal may not be transmitted so as to prevent the noise of the AM radio from overlapping the AM band of the LF band used for transmitting the signal from the LF antenna 31. When the AM radio is used, the request signal may not be transmitted or the test signal may not be transmitted. However, the configuration is not limited thereto. For example, other than AM radio, when using a radio mounted on the vehicle which uses a frequency band overlapping the frequency band used for transmitting the request signal or the test signal, the request signal may not be transmitted or the test signal may not be transmitted.

Figure 4:
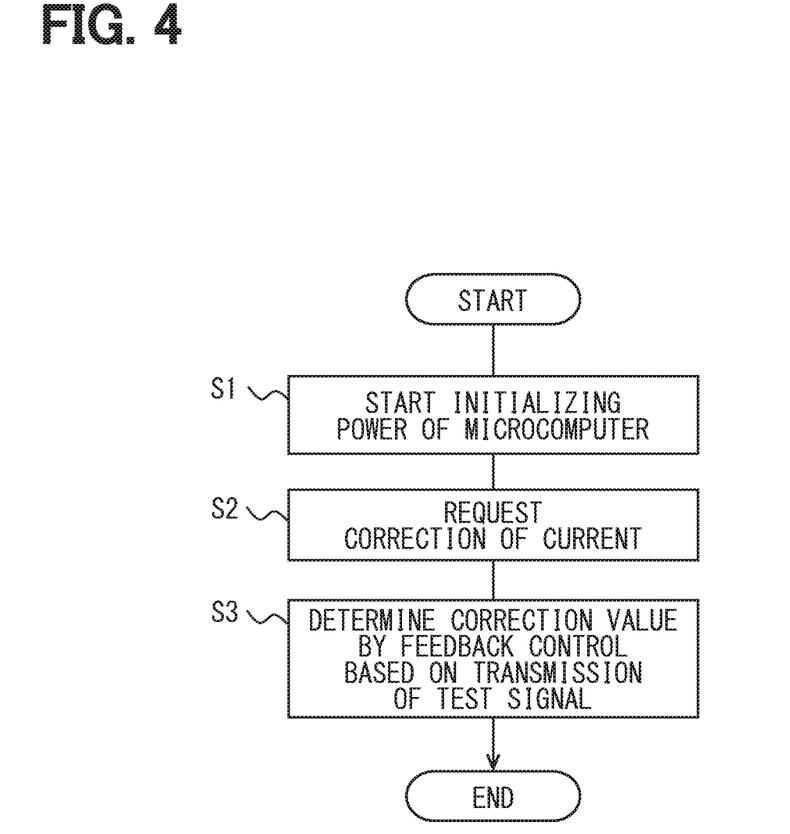
FIG. 4 is a flowchart showing an example of a flow of correction value determination processing in the BCM.
Figure 5:
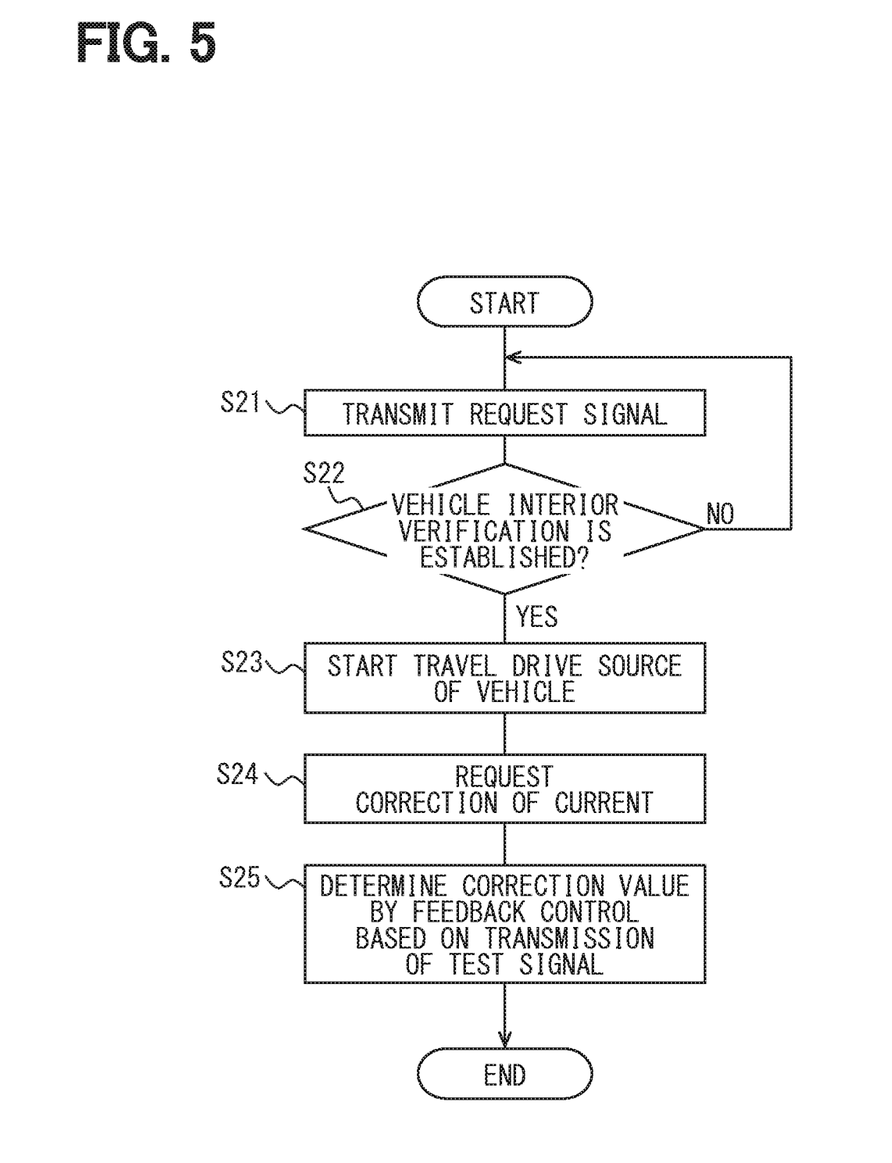
FIG. 5 is a flowchart showing an example of a flow of correction value determination processing in the BCM.
Figure 6:
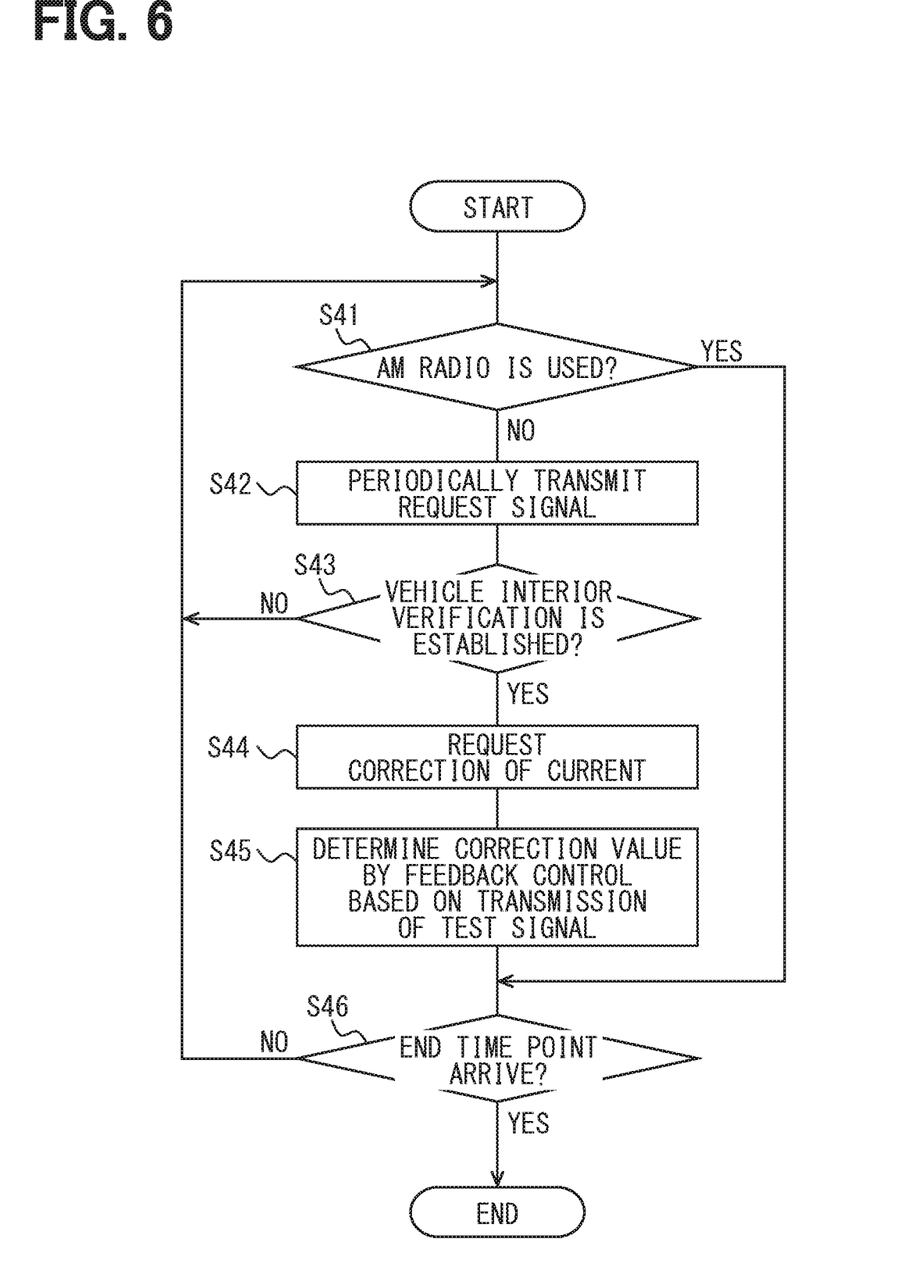
FIG. 6 is a flowchart showing an example of a flow of correction value determination processing in the BCM.

The correction value determination processing shown in FIGS. 4 to 6 may be performed together, or may be partially performed. Further, the time point at which the correction value determination unit 307 determines the correction value is not limited to those shown in FIGS. 4 to 6. As an example, when the vehicle is traveling, the correction value determination unit 307 may determine the correction value without performing the vehicle interior verification. Further, the correction value determination unit 307 may determine the correction value when the vehicle is parked and the operation of the travel drive source is switched from on to off.

In addition, during the polling period in which the LF antenna 31 intermittently transmits the request signal from the vehicle outside verification after getting off of the vehicle to the vehicle outside verification before getting off of the vehicle, the test signal is transmitted and the correction value determination unit 307 may determine the correction value. The determination of the correction value may be performed less frequently than the transmission of the request signal in the polling period. For example, the correction value may be determined once. This is because if there is no change in the parking position of the vehicle, there is a high possibility that the temperature environment does not significantly change. In order to enable a more accurate output of the request signal having the intended intensity in consideration of the temperature difference between day and night in one day, the correction value may be determined more than once.

When the request signal is transmitted, the correction value determination unit 307 may determine the correction value for the request signal by performing the feedback control to the drive current output from the LF driver 303 based on the current detected by the monitor unit 304. In this case, when the request signal is transmitted at a specific time point, the correction value is determined by the feedback control. When the request signal is transmitted thereafter, the drive current for transmitting the request signal may be corrected using the correction value stored in the output setting storage unit 308.

In the first embodiment, the correction value of the drive current output by the LF driver 303 is determined by the feedback control based on the current detected by the monitor unit 304. Thus, the configuration can determine the correction value for accurately adjusting the current flowing through the LF antenna 31 to the target value. After the correction value is determined, the drive current for transmitting the request signal used for the verification is corrected based on the correction value. Thus, the configuration can accurately adjust the current flowing through the LF antenna 31 to the target value, and output the request signal having the accurately intended intensity. As a result, in the authentication system 1 that enables the control of the vehicle based on the establishment of the authentication by the verification via the wireless communication between the vehicle and the portable device 2, the request signal having the accurately intended intensity can be output.

Second Embodiment

Figure 7:
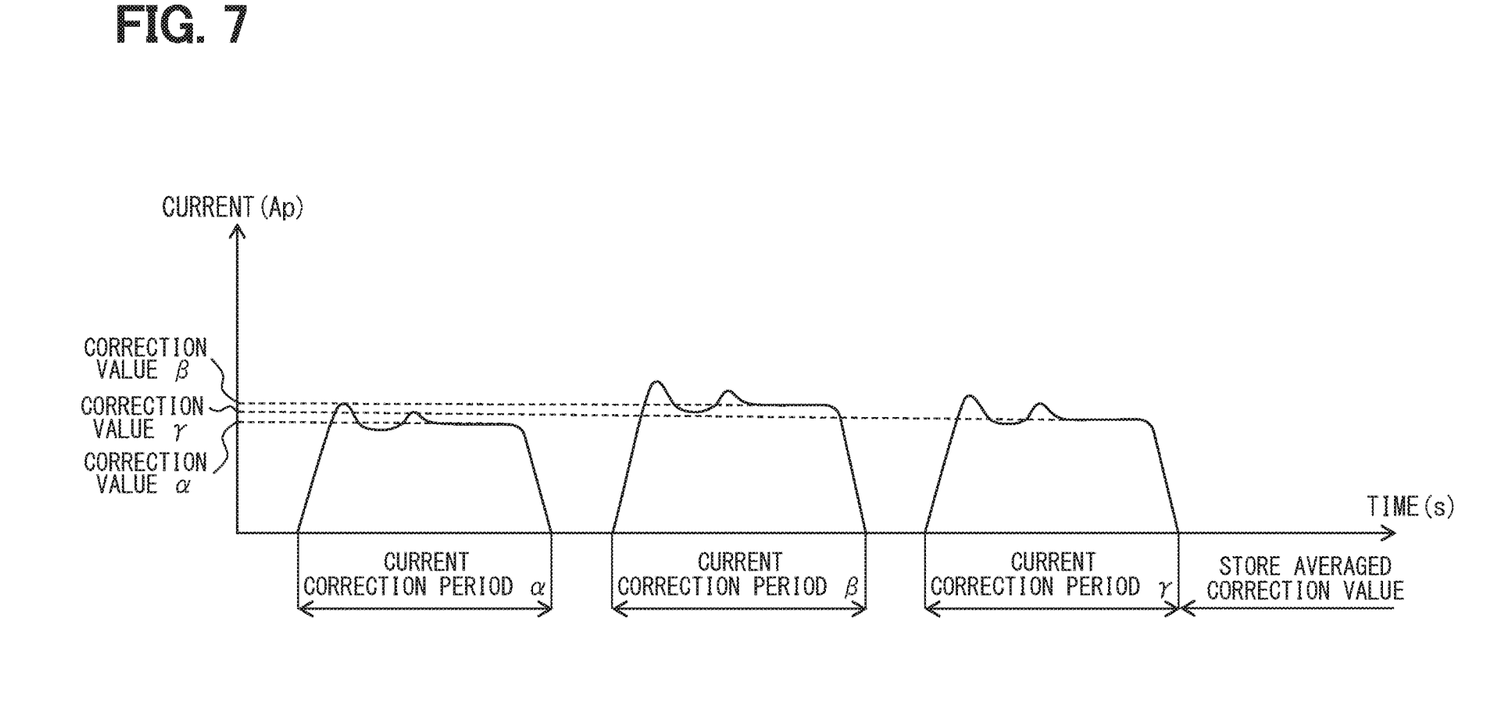
FIG. 7 is a diagram showing an example of determination of the correction value of the drive current by the correction value determination unit.

Further, the correction value determination unit 307 may transmit the above-described test signal for a plurality of times by causing the LF driver 303 to output, for the plurality of times, the drive current adjusted to the same value by the current adjustment unit 306. Then, as shown in FIG. 7, the correction value determination unit 307 calculates the correction values (the correction values a, 13, y in FIG. 7) for the plurality of times by the feedback control to the drive current output from the LF driver 303 based on the current detected by the monitor unit 304. The correction value determination unit 307 may determine the correction value by averaging the calculated correction values for the drive current. Thus, the configuration can determine the correction value more accurately, and output the request signal having the more accurately intended intensity.

Third Embodiment

In the above-described embodiment, the configuration is described in which the authentication system 1 is applied to a vehicle. However, the authentication system 1 may be applied to a subject other than a vehicle. For example, the configuration may be applied to a house, a facility, or the like so as to be used for an authentication of locking and unlocking of door of the house, the facility, or the like.

A flowchart or a process of the flowchart described in the present disclosure includes multiple parts (or steps), and each part is expressed, for example, as S1. Furthermore, each part may be divided into multiple sub-parts, while the multiple parts may be combined into one part. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

Note that the present disclosure is not limited to the embodiments described above and can variously be modified within the scope of claims. An embodiment obtained by appropriately combining the technical means disclosed in the different embodiments is also included in the technical scope of the present disclosure.

What is claimed is:

1. A transmission control device used in an authentication system that enables control of an authentication target based on authentication established by verification via wireless communication between the authentication target and a portable device carried by a user, the transmission control device comprising:

an antenna drive unit configured to output a drive current to a transmission antenna to cause the transmission antenna to transmit a signal having a predetermined frequency band;

a current adjustment unit configured to adjust the drive current output by the antenna drive unit;

a monitor unit configured to detect a current flowing through the transmission antenna; and a correction value determination unit configured to determine a correction value of the drive current by feedback control based on the current detected by the monitor unit, wherein after the correction value determination unit determines the correction value, the current adjustment unit corrects the drive current for transmitting, as the signal, a request signal used for the verification based on the correction value, the correction value determination unit determines the correct value of the drive current for transmitting a test signal output from the antenna drive unit as a trial by the feedback control based on the current detected by the monitor unit, and the test signal is different from the request signal.

2. The transmission control device according to claim 1, wherein:

the authentication target is provided by a vehicle;

the transmission control device is mounted on the vehicle; and the correction value determination unit determines the correction value by causing the antenna drive unit to output the drive current for transmitting the test signal and causing the transmission antenna to transmit the test signal when the transmission control device is connected to a battery and activated for a first time.

3. The transmission control device according to claim 1, wherein:

the authentication target is provided by a vehicle;

the transmission control device is mounted on the vehicle; and the correction value determination unit determines the correction value by causing the antenna drive unit to output the drive current for transmitting the signal and causing the transmission antenna to transmit the signal when the vehicle is parked and after the verification is performed with the portable device in a compartment of the vehicle.

4. The transmission control device according to claim 1, wherein:

the correction value determination unit causes the antenna drive unit to output the drive current for a plurality of times with a same value; and the correction value determination unit determines the correction value by averaging a plurality of correction values of the drive current output from the antenna drive unit calculated by the feedback control based on the currents detected by the monitor unit for the plurality of times.

5. The transmission control device according to claim 1, wherein:
the authentication target is provided by a vehicle;
the transmission control device is mounted on the vehicle; and
the correction value determination unit determines the correction value by causing the antenna drive unit to output the drive current for transmitting the signal and causing the transmission antenna to periodically transmit the signal when the vehicle is traveling.

6. The transmission control device according to claim 5, wherein:
when a radio that is mounted on the vehicle and uses a frequency band that overlaps with the frequency band on which the transmission antenna transmits the signal is used, even when the vehicle is traveling, the correction value determination unit does not cause the transmission antenna to transmit the signal; and
when the radio is not used, the correction value determination unit causes the transmission antenna to periodically transmit the signal.

7. A transmission control device used in an authentication system that enables control of an authentication target based on authentication established by verification via wireless communication between the authentication target and a portable device carried by a user, the transmission control device comprising:
an antenna driver configured to output a drive current to a transmission antenna to cause the transmission antenna to transmit a signal having a predetermined frequency band;
a monitor configured to detect a current flowing through the transmission antenna; and
a processor configured to
adjust the drive current output by the antenna driver, and
determine a correction value of the drive current output from the antenna driver by feedback control based on the current detected by the monitor, wherein
after the processor determines the correction value, the processor corrects the drive current for transmitting, as the signal, a request signal used for the verification based on the correction value,
the processor determines the correction value of the drive current for transmitting a test signal output from the antenna driver as a trial by the feedback control based on the current detected by the monitor, and
the test signal is different from the request signal.

* * * * *